US010807096B2

(12) United States Patent
Abbiati

(10) Patent No.: US 10,807,096 B2
(45) Date of Patent: Oct. 20, 2020

(54) GRINDING CHAMBER OF A GRINDING DEVICE FOR VEGETAL PRODUCTS SUITABLE TO FORM BEVERAGES, PARTICULARLY ROASTED COFFEE BEANS

(71) Applicant: Gruppo Cimbali S.p.A., Binasco (IT)

(72) Inventor: Giacomo Abbiati, Binasco (IT)

(73) Assignee: Gruppo Cimbali S.p.A., Binasco (MI) (IT)

( * ) Notice: Subject to any disclaimer, the term of this patent is extended or adjusted under 35 U.S.C. 154(b) by 337 days.

(21) Appl. No.: 15/709,236

(22) Filed: Sep. 19, 2017

(65) Prior Publication Data

US 2018/0078943 A1    Mar. 22, 2018

(30) Foreign Application Priority Data

Sep. 19, 2016   (IT) ........................ 102016000093820

(51) Int. Cl.
| | |
|---|---|
| *B02C 7/02* | (2006.01) |
| *B02C 7/00* | (2006.01) |
| *D21D 1/30* | (2006.01) |
| *A47J 42/16* | (2006.01) |
| *B01F 7/00* | (2006.01) |
| *B02C 19/00* | (2006.01) |

(52) U.S. Cl.
CPC ................ *B02C 7/02* (2013.01); *A47J 42/16* (2013.01); *B01F 7/005* (2013.01); *B02C 7/00* (2013.01); *B02C 19/0056* (2013.01); *D21D 1/303* (2013.01); *D21D 1/306* (2013.01)

(58) Field of Classification Search
CPC . B02C 7/02; B02C 7/00; D21D 1/303; D21D 1/306
See application file for complete search history.

(56) References Cited

U.S. PATENT DOCUMENTS 4,821,966 A * 4/1989 Ephraim ................. A47J 42/18
                                                        241/247
6,149,084 A * 11/2000 Karg ....................... A47J 42/16
                                                        241/100

(Continued)

FOREIGN PATENT DOCUMENTS

| DE | 8122628 U1 | 7/1983 |
|---|---|---|
| WO | 99/49768 A1 | 10/1999 |
| WO | 2286698 A1 | 2/2011 |

*Primary Examiner* — Faye Francis
(74) *Attorney, Agent, or Firm* — Seed IP Law Group LLP

(57) ABSTRACT

A grinding chamber of a grinding device for vegetal products suitable to form beverages includes, in its interior, a pair of grinders axially overlapping each other, one of which is rotatable with respect to the other which is kept stationary, a grinder support at least for the rotatable grinder, a motor member connected to the grinder support for setting the rotatable grinder in rotation. The grinding chamber is formed by a first bottom wall, perpendicular to the axis of rotation of the rotatable grinder, adjacent and below the support thereof, and at least a second cylindrical wall, connected axially to the first wall at the peripheral boundary thereof. The grinding chamber also includes a first opening for introducing the product to be ground and with a second opening for discharging the ground product. A labyrinth is provided between the peripheral boundary of the first wall and the grinder support.

9 Claims, 3 Drawing Sheets

(56) References Cited

U.S. PATENT DOCUMENTS

| | | | | |
|---|---|---|---|---|
| 6,827,002 B1* | 12/2004 | Lin | ............ | A47J 31/42 |
| | | | | 241/100 |
| 6,830,206 B2* | 12/2004 | Yang | ............ | A47J 42/46 |
| | | | | 241/168 |
| 7,273,005 B2* | 9/2007 | Turi | ............ | A47J 31/42 |
| | | | | 99/275 |
| 8,181,894 B2* | 5/2012 | Majer | ............ | A47J 42/38 |
| | | | | 241/30 |
| 8,297,546 B2* | 10/2012 | Mazzer | ............ | A47J 42/18 |
| | | | | 241/259.1 |
| 8,763,942 B2* | 7/2014 | Hergesell | ............ | A47J 42/18 |
| | | | | 241/100 |
| 9,198,535 B2* | 12/2015 | Righetti | ............ | A47J 42/40 |
| 9,532,682 B1* | 1/2017 | Lassota | ............ | A47J 42/38 |
| 2008/0185465 A1* | 8/2008 | Pai | ............ | A47J 42/08 |
| | | | | 241/100 |
| 2010/0037778 A1* | 2/2010 | Remo | ............ | A47J 42/12 |
| | | | | 99/286 |
| 2012/0001005 A1* | 1/2012 | Kroesen | ............ | A47J 42/16 |
| | | | | 241/257.1 |
| 2012/0138721 A1* | 6/2012 | Hergesell | ............ | A47J 31/42 |
| | | | | 241/277 |
| 2012/0228418 A1* | 9/2012 | Mazzer | ............ | A47J 42/18 |
| | | | | 241/290 |
| 2013/0115351 A1* | 5/2013 | Van Os | ............ | A47J 42/50 |
| | | | | 426/433 |
| 2018/0310767 A1* | 11/2018 | Abbiati | ............ | A47J 42/54 |

* cited by examiner

GRINDING CHAMBER OF A GRINDING DEVICE FOR VEGETAL PRODUCTS SUITABLE TO FORM BEVERAGES, PARTICULARLY ROASTED COFFEE BEANS

BACKGROUND

Technical Field

The present invention relates to the grinding chamber for a grinding device for vegetal products suitable for making beverages, particularly roasted coffee beans, comprising, in its interior, a pair of grinders axially overlapping each other, one of which is rotatable with respect to the other, which is kept stationary, a grinder support at least for said rotatable grinder, a motor member connected to said grinder support for setting said rotatable grinder in rotation, said grinding chamber being formed by a bottom wall, perpendicular to the axis of rotation of the rotatable grinder, adjacent and below the grinder support thereof, as well as at least a cylindrical wall axially connected to said bottom wall at the peripheral boundary thereof, said grinding chamber being further provided with a first opening for introducing the beans of the product to be ground therein and a second opening for discharging the ground product.

Description of the Related Art

It is known that, when preparing a coffee beverage, the quality of the raw materials used—that is to say the water and the roasted coffee—play a fundamental role.

With regards to coffee, the grinding operation of the beans for transforming them into powder to be used in the filter holders of the machines for making the beverage is of significant interest, not only for the level of fineness that is to be obtained but also for the possible organoleptic transformations undergone by the ground powder, depending on the mechanical structure of the grinding device and the frequency with which the grinding operations are performed.

Commonly, roasted coffee beans arrive by gravity through a hopper in a cylindrical chamber, called a grinding chamber, in which two grinders overlapping each other operate, one normally fixed and the other rotatable about the vertical axis of the cylindrical chamber due to the action of an electric motor on which shaft it is mounted with the interposition of a grinder support.

Also the fixed or stationary grinder is mounted on a corresponding grinder support, at times in a position which is axially adjustable, in order to select the grinding level to be obtained, as is particularly required for professional and automated coffee machines.

Ground coffee powder in a predetermined dose is expelled outside the grinding chamber due to the centrifugal force during grinding, through a radial or tangential opening formed in the cylindrical wall of the grinding chamber itself, and it is caused to flow in a predetermined dose from this opening, through a conventional duct, into the filter holder of a machine for making the beverage.

However, in practice, when dispensing a predetermined dose of ground coffee, the grinding device produces a greater, albeit slightly greater, quantity of ground product with respect to the actual dose discharged by the device.

Accordingly, inevitably the deposit of a quantity of ground coffee powder remains in the grinding chamber at the end of a grinding and dispensing operation of a dose.

As time passes, the quantity of ground coffee stagnating inside the grinding chamber undergoes phenomena of rancidity due to the oxidation of the grease contained in the ground coffee powder, accentuated also by the action of the heat generated by the electric motor actuating the grinder during the various grinding operations.

The rancidity of the ground coffee powder stagnating in the grinding chamber deteriorates the quality of the ground coffee powder dispensed and used for making the beverage, with subsequent deterioration of the aroma thereof.

The presence of a given quantity of rancid ground coffee in the grinding chamber may also cause the drawback that part thereof may be dragged, during dispensing, together with the dose envisioned, thus accordingly increasing the total quantity of coffee powder reaching the filter holder to be used for making the beverage.

This causes the production of a more generous beverage than the one associated with the dose envisaged and a worse beverage in terms of organoleptic qualities due to the presence of a given quantity of rancid coffee.

In the case of professional grinding devices cooperating with coffee machines via Wi-Fi® or Bluetooth®, the above-mentioned circumstance, which results in a variation of the average flow rate of the beverage, is detected by the grinding device. If after five or six dispensing operations, such an average flow rate never corresponds with the ideal reference one saved in the device itself, the latter automatically corrects the grinding level of the coffee beans by varying the distance between the grinders so as to have a particle size which allows obtaining a flow rate value corresponding to the ideal one.

In these cases, the accumulation of ground coffee in the grinding chamber causing an intervention on the grinders to correct particle size and accordingly, the flow rate of the beverage, therefore also causes a delay in dispensing the ground coffee to the filter holder.

BRIEF SUMMARY

The object of the invention is to present a structural solution for the grinding chamber of a device for particularly grinding roasted coffee beans, which may minimize the drawbacks mentioned above and associated with the stagnation of a quantity of ground coffee in the grinding chamber.

These and other objects which are more apparent in the following description, are achieved by a grinding chamber of a grinding device for vegetal product beans, particularly for roasted coffee beans, which is characterized in that labyrinth means 18, 21, 22, 22a, 22b are provided between the peripheral boundary of said bottom wall 3 perpendicular to the axis of rotation of the rotatable grinder 9 adjacent and below the grinder support 7 thereof and the grinder support itself of the rotatable grinder.

BRIEF DESCRIPTION OF THE SEVERAL VIEWS OF THE DRAWINGS

The invention is now described in greater detail with reference to a practical embodiment thereof, given by mere way of a non-limiting example in the accompanying drawings, in which.

DETAILED DESCRIPTION

Figure 1:
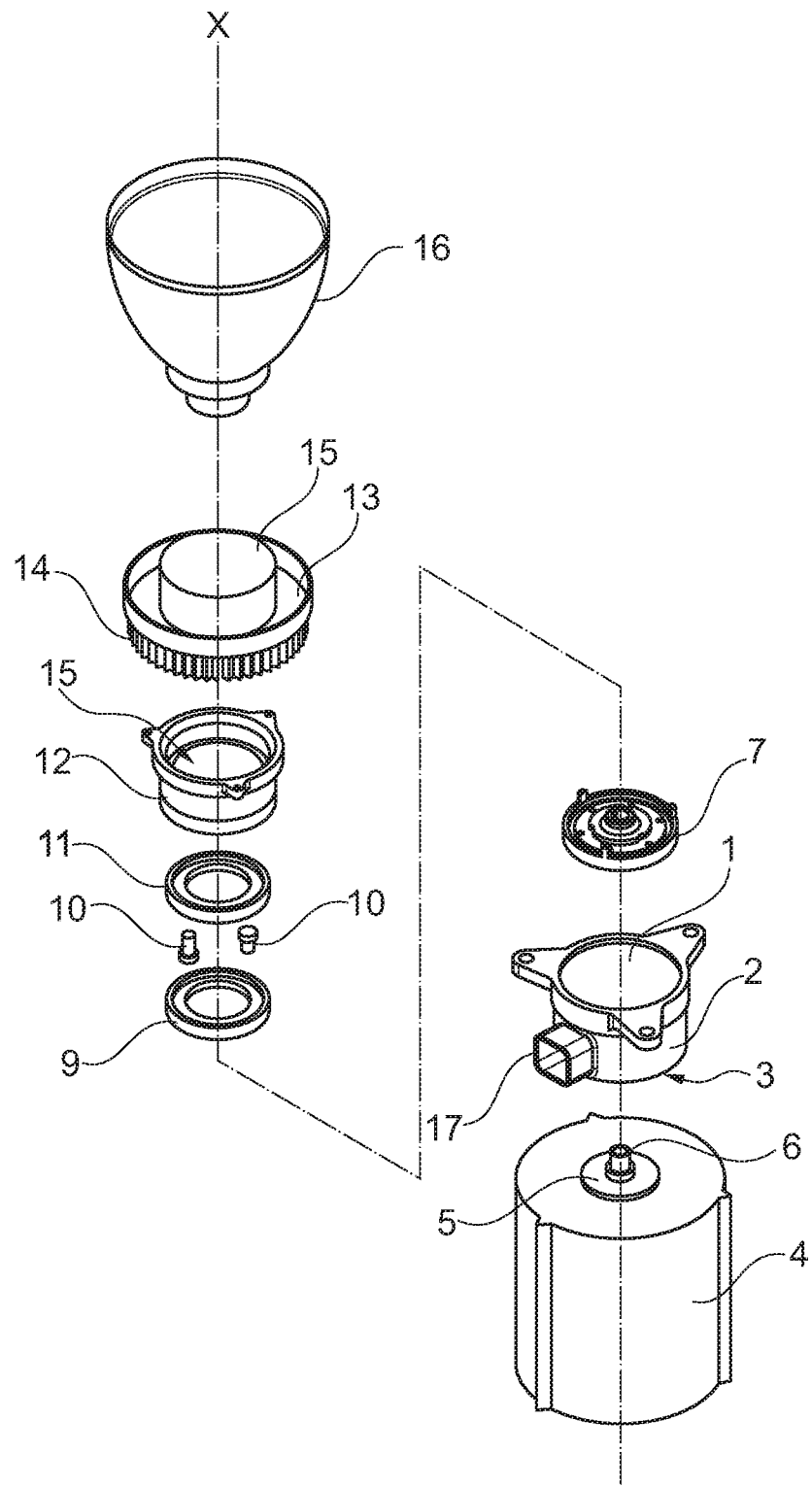
FIG. 1 shows an exploded view of the schematic structure of a grinding device for vegetal products, particularly for roasted coffee beans.

With reference to the aforesaid drawings and in particular to FIG. 1, it is worth noting that a grinding device, for example for grinding roasted coffee beans to be sent to the filter holder of a machine for making the beverage, comprises a grinding chamber 1 enclosed by a cylindrical wall 2 (which may also be referred to herein as a first wall 2) and by a bottom wall 3 (which may also be referred to herein as a second wall 3) which is perpendicular to an axis of rotation X-X of the device. The latter is joined in conventional manner to the carcass 4 of an electric motor 5 which drive shaft 6 engages axially with a grinder support 7 by means of a connecting screw 8. A rotatable grinder 9 is connected to the grinder support 7 by means of screws 10.

The device comprises also a stationary grinder 11, opposed axially to the rotatable grinder 9, mounted on a tubular support 12 in turn connected axially, particularly in professional grinding devices, to a ring nut 13 which, by means of a motor mechanism (not illustrated) which engages with a peripheral toothing 14 of the ring nut 13, adjusts the axial position of the stationary grinder 11 relative to the rotating grinder 9 in order to vary the grinding particle size.

The ring nut 13, the tubular support 12 and the grinders 9 and 11 are axially open forming a duct 15 (which may also be referred to herein as a first opening 15) for allowing the loading of coffee beans to be ground through a hopper 16 and the falling thereof, by gravity, into the grinding chamber 1 where there is set in rotation the rotatable grinder 9 which is fixed, as mentioned above, to the drive shaft 6 of the electric motor 5.

The ground product is expelled from the grinding chamber 1 due to the centrifugal action generated by the rotating grinder 9 during the grinding, through the radial discharge opening 17 (which may also be referred to herein as a second opening 17) with slide 17a formed in the cylindrical wall 2 of the grinding chamber 1.

Figure 2:
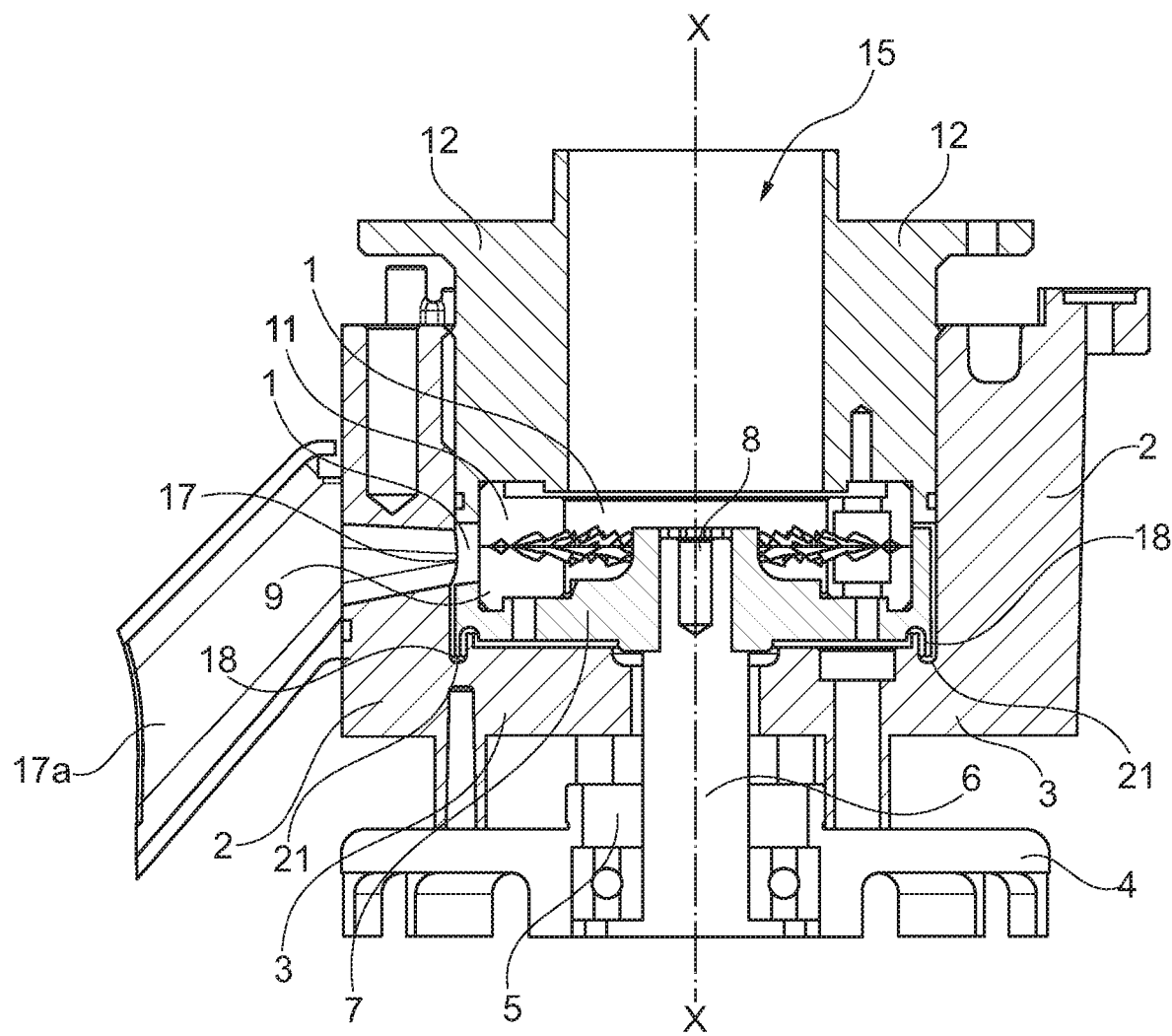
FIG. 2 shows a vertical section view of a grinding device for roasted coffee beans provided with grinding chamber according to the invention.
Figure 3:
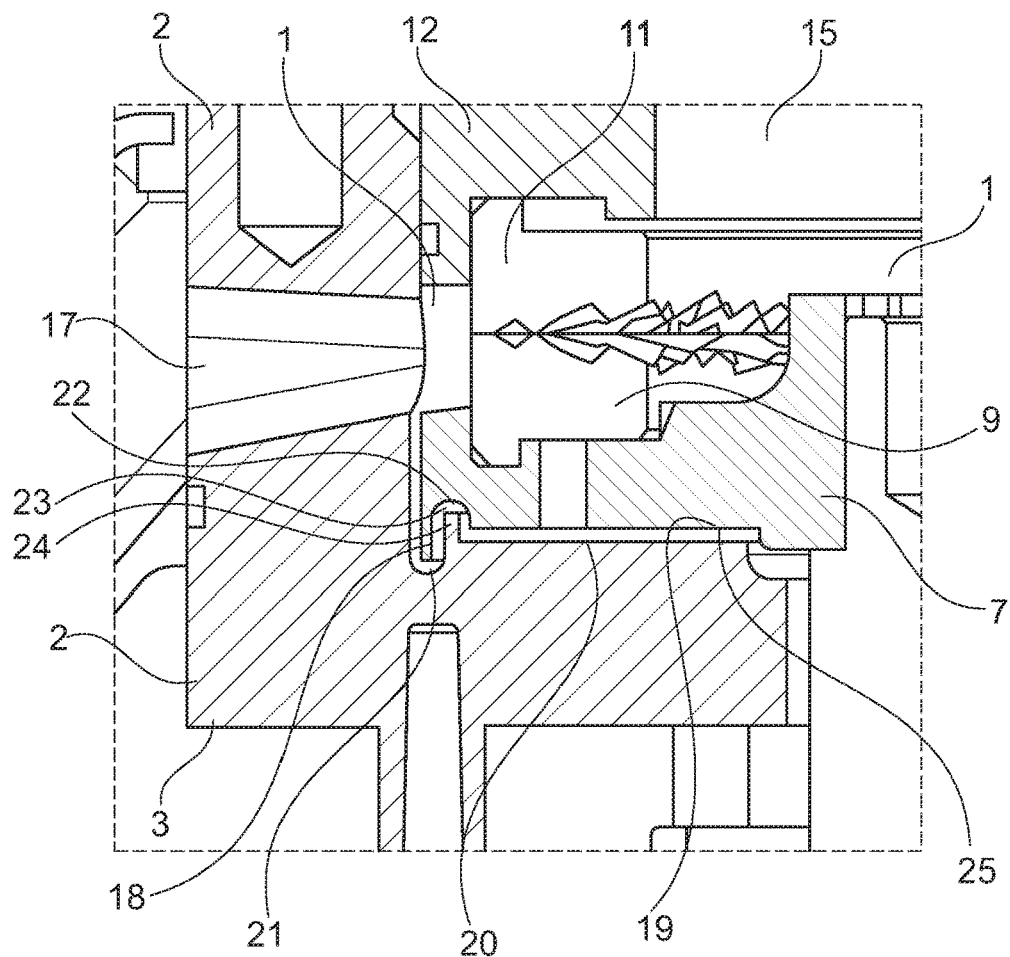
FIG. 3 shows an enlarged-scale portion of FIG. 2.
Figure 4:
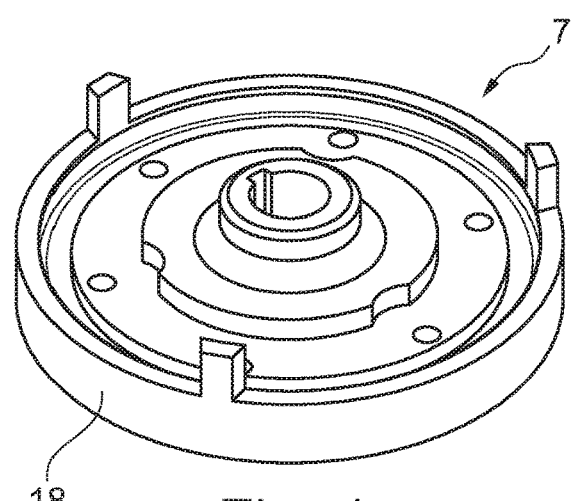
FIG. 4 shows a grinder support.

With reference to FIGS. 2 and 3, and according to the invention, the grinding chamber 1 is formed by the bottom wall 3, which is perpendicular to the axis of rotation X-X of the device coinciding with an axis of rotation of the drive shaft 6 of the electric motor 5, and by the cylindrical wall 2 to which boundary the bottom wall 3 is fixed.

The grinder support 7 for the rotatable grinder 9, placed within the grinding chamber 1, has, on the peripheral boundary thereof, a peripheral edge 18 which protrudes axially starting from the plane 19 of the adjacent grinder support 7 frontally to the plane 20 of the bottom wall 3, towards this last wall. Said peripheral edge 18 is positioned within an annular groove 21 formed in the bottom wall 3 with dimensions such as to house it at least partially, that is with a clearance comprised between 0.5 mm and 1.5 mm between the opposed walls. Such value corresponds substantially also to the radius of curvature of the zone 22 in which the peripheral edge 18 joins to the plane 19 of the grinder support 7.

By way of example, the axial extension of the peripheral edge 18 with respect to the plane 19 of the grinder support 7 is preferably equal to about 3-7 mm.

The zone 22 in particular comprises a second annular groove 23 extending axially within the grinder support 7 of the rotatable grinder 9. An annular relief 24 protruding axially from the plane 20 of the bottom wall 3 which limits the grinding chamber 1 at the bottom is inserted at least partially in such second annular groove 23.

The second annular groove 23 and the annular relief 24 are concentric with the first groove 21 and are positioned radially therein.

Thereby, labyrinth means, depicted by the peripheral edge 18, by the annular groove 21 and by the connection zone 22, as well as by the second annular groove 23 and by the annular relief 24 inserted therein, are formed between the peripheral boundary of the bottom wall 3 where this connects to the end of the cylindrical wall 2, and the grinder support 7 of the rotatable grinder 9.

Such labyrinth means limit the quantity of ground product which, during grinding, may pass freely from the chamber 1 to the gap 25 between the plane 19 of the grinder support 7 and the plane 20 of the bottom wall 3, and may stagnate and deteriorate there.

According to the invention therefore, the drawbacks resulting from the ground coffee which remains in the grinding chamber are limited because the quantity thereof which may stagnate due to a limited space available for the stagnation and the formation of a torturous path for reaching such available space, is reduced.

Although the actuation of the present invention is described in reference to grinding devices that dispense a predetermined dose, the invention may be applied also to grinding devices equipped with a tank for storing the ground product intended to be dispensed in variable doses at times following the grinding.

Indeed, the technical solution according to the invention allows avoiding an excess of ground product stagnating in the grinding chamber from deteriorating—with its rancid odour—the product accumulated waiting to be dispensed.

The invention claimed is:

1. A grinding chamber of a grinding device for vegetal products suitable for making beverages, comprising:
    a pair of grinders axially overlapping each other and positioned in an interior of the grinding chamber, one of which is rotatable with respect to the other, which is kept stationary;
    a grinder support coupled to the rotatable grinder;
    a motor member connected to said grinder support for setting said rotatable grinder in rotation;
    a bottom wall perpendicular to an axis of rotation of the rotatable grinder, adjacent and below the grinder support;
    a cylindrical wall connected to the bottom wall at a peripheral boundary of the bottom wall;
    a first opening for introducing a product to be ground therein;
    a second opening for discharging a ground product; and
    a labyrinth provided between the peripheral boundary of the bottom wall and the grinder support, the labyrinth including:
        a first annular groove extending into the bottom wall at a peripheral boundary of the bottom wall where the bottom wall connects to the cylindrical wall;
        a peripheral edge extending from the grinder support to be at least partially received in the first annular groove;
        a second annular groove extending into the grinder support proximate the peripheral edge; and
        an annular relief protruding from the bottom wall of the grinding chamber, the annular relief at least partially received in the second annular groove, the second annular groove and the annular relief being concentric with the first annular groove.

2. The grinding chamber according to claim 1, wherein the peripheral edge of the grinder support extends between 3 and 7 mm from the grinder support to be at least partially received in the first annular groove.

3. The grinding chamber according to claim 1, wherein a radius of curvature of a zone joining said peripheral edge and a plane of the grinder support is in a range between 0.5 mm and 1.5 mm.

4. The grinding chamber according to claim 1, wherein the first annular groove is configured to fully accommodate said peripheral edge of the grinder support.

5. The grinding chamber according to claim 1, wherein said second opening for discharging the ground product from the grinding chamber is formed in said cylindrical wall.

6. The grinding chamber according to claim 1, wherein said pair of grinders consists of annular-shaped grinders.

7. A device, comprising:
a grinding chamber including a first wall and a second wall connected to the first wall, the grinding chamber further including a first opening configured to receive a product to be ground in the grinding chamber and a second opening configured to discharge a ground product;
a rotatable grinder received in the grinding chamber;
a stationary grinder received in the grinding chamber;
a grinder support coupled to the rotatable grinder; and
a labyrinth positioned proximate an interface between the first wall and the second wall of the grinding chamber, the labyrinth including:
a first annular groove extending into the first wall adjacent the second wall;
a peripheral edge extending from the grinder support and at least partially received in the first annular groove;
a second annular groove extending into the grinder support proximate the peripheral edge; and
an annular relief protruding from the bottom wall of the grinding chamber, the annular relief at least partially received in the second annular groove.

8. The device of claim 7 further comprising:
a motor connected to the grinder support and configured to rotate the rotatable grinder.

9. The device of claim 7 wherein the second annular groove and the annular relief are concentric with the first annular groove.

* * * * *